United States Patent
Rajagopal et al.

(10) Patent No.: US 9,787,525 B2
(45) Date of Patent: *Oct. 10, 2017

(54) CONCURRENCY CONTROL IN A FILE SYSTEM SHARED BY APPLICATION HOSTS

(71) Applicant: VMware, Inc., Palo Alto, CA (US)

(72) Inventors: Haripriya Rajagopal, Sunnyvale, CA (US); Satyam Vaghani, San Jose, CA (US); Yuen-Lin Tan, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 14/011,444

(22) Filed: Aug. 27, 2013

(65) Prior Publication Data

US 2014/0040395 A1    Feb. 6, 2014

Related U.S. Application Data

(63) Continuation of application No. 12/502,086, filed on Jul. 13, 2009, now Pat. No. 8,521,686.

(51) Int. Cl.
*G06F 17/30* (2006.01)
*H04L 29/08* (2006.01)

(52) U.S. Cl.
CPC .. *H04L 29/08549* (2013.01); *G06F 17/30168* (2013.01)

(58) Field of Classification Search
CPC ................................................ G06F 17/30168
See application file for complete search history.

(56) References Cited

U.S. PATENT DOCUMENTS

| | | | |
|---|---|---|---|
| 3,737,879 A | * | 6/1973 | Greene ................. G11C 11/406 365/222 |
| 5,410,697 A | | 4/1995 | Baird et al. |
| 5,857,205 A | | 1/1999 | Roth |
| 5,926,833 A | | 7/1999 | Rasoulian et al. |
| 6,145,098 A | * | 11/2000 | Nouri ........................ G06F 1/20 714/31 |
| 6,216,202 B1 | | 4/2001 | D'Errico |

(Continued)

FOREIGN PATENT DOCUMENTS

CN    WO 2008138248 A1 *    11/2008    ........... H04L 12/185

*Primary Examiner* — James Trujillo
*Assistant Examiner* — Hubert Cheung

(57) ABSTRACT

A manager program for managing virtual machines includes a process which receives a notification message indicating an occurrence of an event affecting a data storage unit in a data storage system that supports a shared file system. The notification message might have come from a virtual machine host or resulted from a hardware reconfiguration. The manager program then determines whether another virtual machine host is sharing the data storage unit. The manager program might make this determination by polling each of the virtual machine hosts it manages or by checking information previously collected and stored in a database. If another virtual machine host is sharing the data storage unit, the manager program sends a refresh message to that virtual machine host that causes the virtual machine host to update information relating to the data storage unit in a cache associated with the virtual machine host.

21 Claims, 13 Drawing Sheets

(56) References Cited

U.S. PATENT DOCUMENTS

| | | | |
|---|---|---|---|
| 6,247,096 B1* | 6/2001 | Fisher | G06F 3/0607 |
| | | | 707/999.202 |
| 6,493,804 B1 | 12/2002 | Soltis et al. | |
| 6,789,156 B1 | 9/2004 | Waldspurger | |
| 6,925,308 B2 | 8/2005 | Goldsmith et al. | |
| 7,143,122 B2 | 11/2006 | Burton et al. | |
| 7,222,221 B1 | 5/2007 | Agesen et al. | |
| 7,225,211 B1 | 5/2007 | Colgrove et al. | |
| 7,337,171 B2 | 2/2008 | Gimpl et al. | |
| 7,685,176 B2 | 3/2010 | Burton et al. | |
| 7,698,593 B2 | 4/2010 | Kariv | |
| 7,752,417 B2 | 7/2010 | Manczak et al. | |
| 7,783,591 B2 | 8/2010 | Long et al. | |
| 7,822,941 B2 | 10/2010 | Vick et al. | |
| 7,827,381 B2 | 11/2010 | Manczak et al. | |
| 7,840,764 B2 | 11/2010 | Gimpl et al. | |
| 7,917,710 B2 | 3/2011 | Freeman et al. | |
| 7,962,577 B2 | 6/2011 | Nakamura et al. | |
| 8,006,043 B2 | 8/2011 | Agesen | |
| 8,060,470 B2 | 11/2011 | Davidson et al. | |
| 8,521,686 B2 | 8/2013 | Rajagopal et al. | |
| 2001/0016038 A1* | 8/2001 | Sammon | H04M 3/42153 |
| | | | 379/202.01 |
| 2002/0080508 A1* | 6/2002 | Alex | G11B 19/04 |
| | | | 360/31 |
| 2002/0161849 A1* | 10/2002 | Fleming | G06F 9/5061 |
| | | | 709/214 |
| 2002/0181308 A1* | 12/2002 | Shimoyama | G11C 11/406 |
| | | | 365/222 |
| 2003/0153362 A1 | 8/2003 | Goldsmith et al. | |
| 2005/0154941 A1 | 7/2005 | Lee et al. | |
| 2006/0075106 A1* | 4/2006 | Hochmuth | H04L 67/125 |
| | | | 709/227 |
| 2006/0101062 A1* | 5/2006 | Godman | G06F 9/5038 |
| 2006/0168002 A1* | 7/2006 | Chesley | H04L 12/1822 |
| | | | 709/205 |
| 2006/0259710 A1 | 11/2006 | Gimpl et al. | |
| 2007/0038888 A1 | 2/2007 | Kariv | |
| 2007/0101186 A1* | 5/2007 | Chen | G06F 11/1456 |
| | | | 714/6.11 |
| 2007/0283115 A1 | 12/2007 | Freeman et al. | |
| 2007/0283120 A1* | 12/2007 | Fujita | G06F 3/0613 |
| | | | 711/170 |
| 2007/0283123 A1 | 12/2007 | Vick et al. | |
| 2007/0283124 A1 | 12/2007 | Manczak et al. | |
| 2007/0283125 A1 | 12/2007 | Manczak et al. | |
| 2008/0016272 A1* | 1/2008 | Harrand | G11C 11/406 |
| | | | 711/106 |
| 2008/0037347 A1 | 2/2008 | Kusaka | |
| 2008/0104077 A1 | 5/2008 | Gimpl et al. | |
| 2009/0161467 A1* | 6/2009 | Lin | G11C 11/40603 |
| | | | 365/222 |
| 2009/0235247 A1 | 9/2009 | Cho et al. | |
| 2010/0082934 A1* | 4/2010 | Naganuma | G06F 3/0607 |
| | | | 711/170 |
| 2010/0161574 A1 | 6/2010 | Davidson et al. | |
| 2010/0332890 A1 | 12/2010 | Chen et al. | |

* cited by examiner

CONCURRENCY CONTROL IN A FILE SYSTEM SHARED BY APPLICATION HOSTS

CROSS-REFERENCES TO RELATED APPLICATIONS

The present application is a continuation of U.S. patent application Ser. No. 12/502,086, filed Jul. 13, 2009, entitled "CONCURRENCY CONTROL IN A FILE SYSTEM SHARED BY APPLICATION HOSTS," issued on Aug. 27, 2013 as U.S. Pat. No. 8,521,686, the entire contents of which are incorporated herein by reference for all purposes.

BACKGROUND

A shared file system typically refers to an enterprise storage file system that is concurrently shared (e.g., accessed for reading and writing) by multiple computer systems. One example of such a shared file system is VMware's VMFS (Virtual Machine File System), which enables multiple virtual machines that are instantiated on one or more physical servers to operate under a common file system whose data storage is implemented on a shared data storage system.

An example of such a shared data storage system is a disk array accessible through a storage area network (SAN) which typically uses a storage protocol such as Fibre Channel Protocol (FCP) or Internet Small Computer System Interface (iSCSI). A typical SAN provides access to a number of data storage systems that are physically independent enclosures containing a storage system manager (e.g., a disk array controller), a disk cache, and multiple physical data storage units (e.g., disk drives). The storage system manager manages the physical data storage units and exposes them to the connected computer systems as logical data storage units, each identified by a logical unit number (LUN), enabling storage operations to be carried out on the LUNs. For further details, see U.S. Pat. No. 7,155,558, which is incorporated herein by reference.

The term "concurrency control" refers to the means used to prevent multiple contexts (e.g., the processes running on the multiple connected computer systems) from simultaneously accessing the same file system resources and causing data corruption in a shared file system. Typically, concurrency control in a shared filed system involves a messaging system in which the multiple computer systems communicate with each other before a file is locked for writing by one of the contexts running on said computer systems. VMFS implements this concurrency control without requiring participating computer systems to communicate with each other using a messaging system that is separate from the data storage system. For further details, see U.S. Published Patent Application No. 2009/0106248, which is incorporated herein by reference.

SUMMARY

In an example embodiment, a manager program for managing virtual machines includes a process which receives a notification message indicating an occurrence of an event affecting a data storage unit in a data storage system that supports a shared file system. The notification message might have come from a virtual machine host or resulted from a hardware reconfiguration or failure. The manager program then determines whether another virtual machine host is sharing the data storage unit. The manager program might make this determination by polling each of the virtual machine hosts it manages or by checking information previously collected and stored in a database. If another virtual machine host is sharing the data storage unit, the manager program sends a refresh message to that virtual machine host that causes the virtual machine host to update information relating to the data storage unit in a cache associated with the virtual machine host. The manager program then displays the updated information in a view in a graphical user interface (GUI).

In another example embodiment, a manager program for managing application instances includes a process which receives a notification message indicating an occurrence of an event affecting a data storage unit in a data storage system that supports a shared file system. The notification message might have come from a host for an application instance or resulted from a hardware reconfiguration or failure. The manager program then determines whether another host for an application instance is sharing the data storage unit. The manager program might make this determination by polling each of the hosts it manages or by checking information previously collected and stored in a database. If a host for an application instance is sharing the data storage unit, the manager program sends a refresh message to that host that causes the host to update information relating to the data storage unit in a cache associated with the host. The manager program then displays the updated information in a view in a GUI.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

As used in this disclosure, a data storage unit (DSU) is a uniquely identifiable data storage device or a uniquely identifiable portion of a data storage device. For example, in a SAN having multiple physical LUNs, with each physical LUN having a unique ID (identification) as a LUN, each physical LUN is considered a DSU. A datastore is a DSU which (a) is formatted with a file system and (b) has a unique ID as a datastore.

Figure 1:
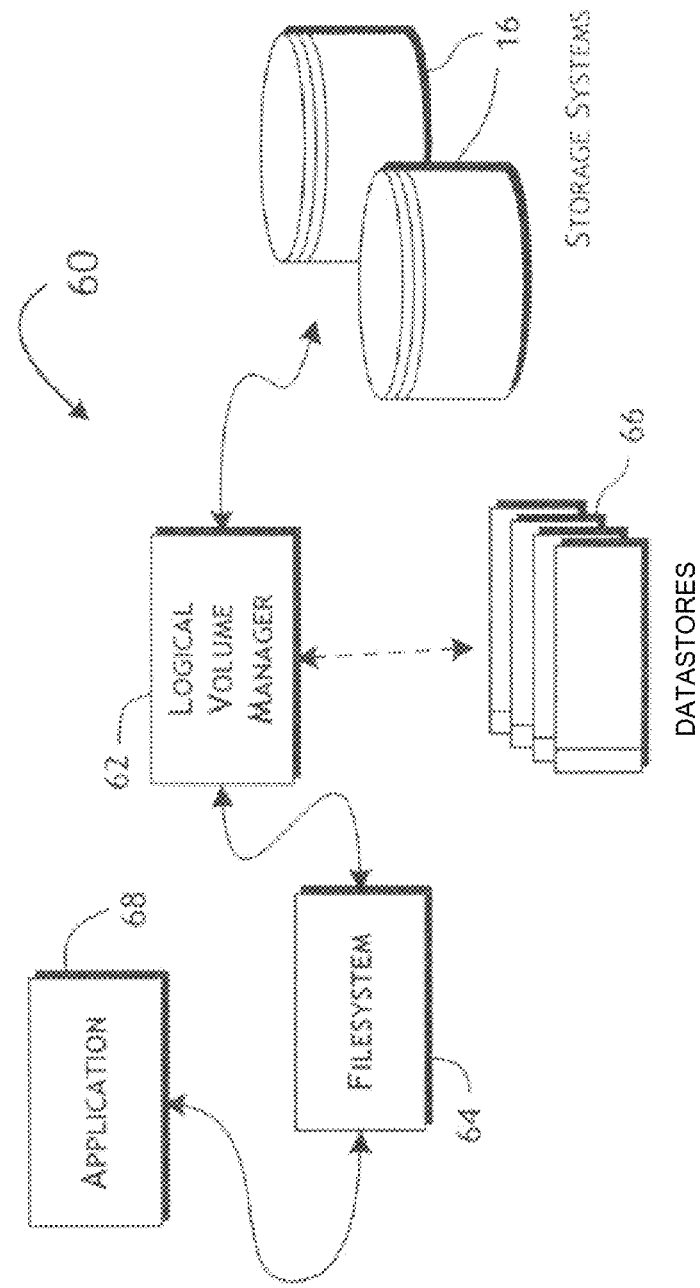
FIG. 1 is a schematic diagram of a file system with a logical volume manager, in accordance with an example embodiment.

FIG. 1 is a schematic diagram of a file system with a logical volume manager, in accordance with an example embodiment. As illustrated in FIG. 1, a system 60 implements a logical volume manager 62 on a computer system (not shown) at a tier above the data storage systems 16, as a software layer beneath a local file system layer 64. By virtue of the logical volume manager 62, the local file system layer 64 is presented with a view of one or more discrete datastores 66, each of which is capable of containing a complete file system data structure. The specific form and format of the file system data structure is determined by the particular file system layer 64. In an example embodiment, the local file system layer 64 might be the VMware's Virtual Machine file system (VMFS), the New Technology file system (NTFS), the Unix file system (UFS), or the Linux third extended file system (ext3FS).

In an example embodiment, each of the datastores 66 is constructed by the logical volume manager 62 from an administratively defined set of one or more data DSUs presented by the network storage systems 16. That is to say, the logical volume manager 62 can span a file system across a number of the DSUs in the set of DSUs to create one of datastores 66. It will be appreciated that the logical volume manager 62 is responsible for functionally managing and distributing data transfer operations to each of the various DSUs in datastores 66. The operation of the logical volume manager 62 is transparent to applications 68, which are executed directly by the computer system.

Figure 2:
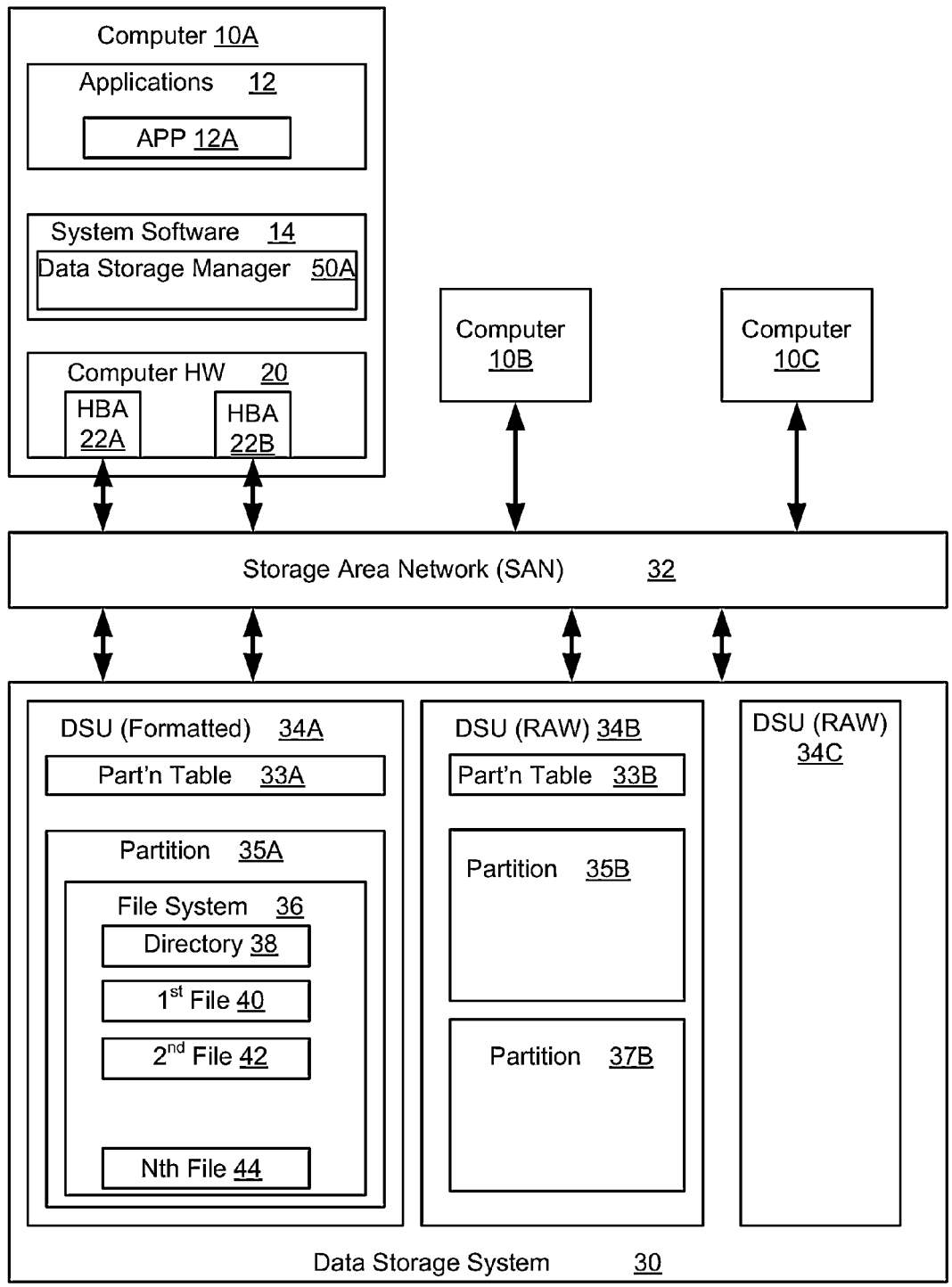
FIG. 2 is a schematic diagram of a formatted file system, in accordance with an example embodiment.

FIG. 2 is a schematic diagram of a formatted file system, in accordance with an example embodiment. FIG. 2 shows a computer system comprising a plurality of computers, including a first computer 10A, a second computer 10B, and a third computer 10C, connected to a data storage system 30. The data storage system 30 comprises a first DSU 34A, a second DSU 34B and a third DSU 34C. In FIG. 2, the first DSU 34A is system-formatted with a file system, while the second DSU 34B and the third DSU 34C are raw devices. The DSUs 34A, 34B, and 34C may be from any of various types of data storage devices, such as disks or tapes, or some combination of different types of devices. FIG. 2 shows a SAN 32 providing an interface between the computers 10A, 10B and 10C and the data storage system 30, although other data interfaces (e.g., an Internet Small Computer System Interface or iSCSI), either simpler or more complex, might also be used.

As shown in FIG. 2, the system-formatted DSU 34A includes a partition table 33A and a single partition 35A. The partition 35A includes a file system 36, including a directory 38 and a plurality of files, including a first file 40, a second file 42, and an Nth file 44. The file system 36 may be virtually any type of file system, including VMware's VMFS. Various other structures or organizations for the system-formatted DSU 34A are also possible. The DSU 34B also includes a partition table 33B, along with a first partition 35B and a second partition 37B. The DSU 34C is shown without any partition table or any distinct partitions. Together, the DSUs 34B and 34C illustrate the fact that raw data storage devices might either be divided into multiple partitions or they may be left as a single data storage area.

The computers 10A, 10B and 10C might be substantially the same as each other, or they might be different. The computer 10A, for example, might include computer hardware 20, including one or more processors, system memory, etc. In turn, the computer hardware 20 might include a first host bus adapter (HBA) 22A and a second HBA 22B for interfacing with the storage area network 32. Alternatively, the computer hardware 20 might include other interface cards or devices for interfacing with other types of data storage devices or networks.

The computer 10A also includes system software 14 running on the computer hardware 20 and a set of applications 12, including a particular application 12A, running on the system software 14. In an example embodiment, the particular application 12A might be a virtual machine (VM) host, as described in greater detail below. The system software 14 might include any of a wide variety of OSs, such as a version of a Windows® OS from Microsoft Corporation or a distribution of Linux®. The system software 14 might also include other system software, such as an advanced storage multipath manager or other software units that provide other basic or advanced capabilities. In this disclosure, system software is referred to as an OS for simplicity, although any reference to an OS is not intended to preclude software that provides other functionality that is not generally included in a basic OS.

The system software 14 provides functionality for managing interactions with attached or otherwise accessible data storage devices. This functionality might be conceptually grouped together into a generalized functional unit, which will be referred to as a data storage manager 50A. Thus, the data storage manager 50A shown in FIG. 2 manages interactions between the application 12A and the DSUs 34A, 34B and 34C, for example. As one particular example, the data storage manager 50A might enable the application 12A to read from and/or write to the first file 40 on the first DSU 34A. The data storage manager 50A might also enable the application 12A to read from and/or write to the second DSU 34B, as another example. In one embodiment, Data Store Manager 50A includes implementation of Logical Volume Manager 62 and Filesystem 64 (FIG. 1).

Figure 3:
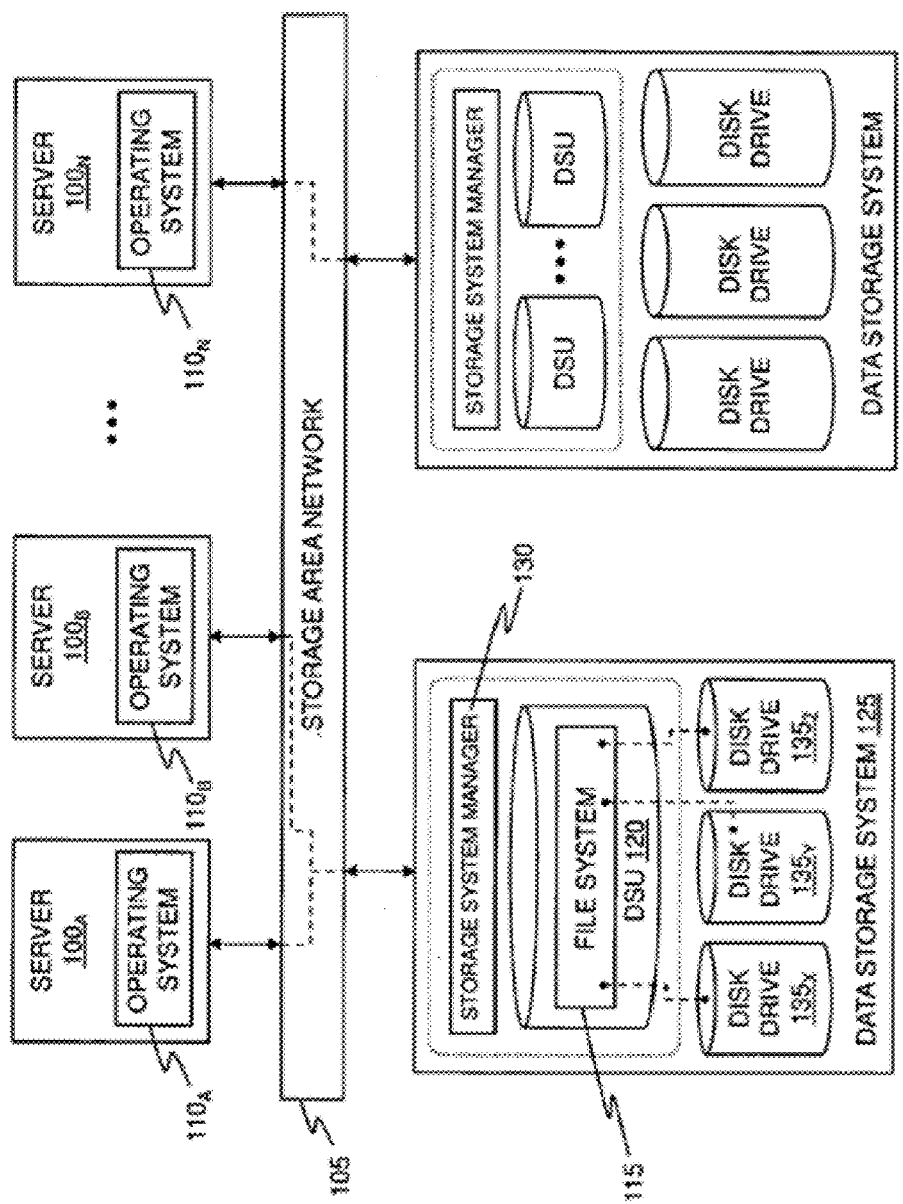
FIG. 3 is a schematic diagram of a shared file system, in accordance with an example embodiment.

FIG. 3 is a schematic diagram of a shared (or clustered) file system, in accordance with an example embodiment. The shared (or clustered) file system might be VMware's Virtual Machine File System (VMFS), though the embodiments described below might work with any analogous file system. For ease of understanding, the shared file system depicted in FIG. 3 does not show an application program running on operating systems $110_A$ to $110_N$. However, in an example embodiment, the application program might be a virtual machine (VM) host, e.g., VMware ESX Server™ or a successor product sold by VMware, Inc., and the file system might be VMware's VMFS, which is a shared (or clustered) file system.

The computer system of FIG. 3 includes multiple servers $100_A$ to $100_N$, each of which is connected to SAN 105. Operating systems $110_A$ and $110_B$ on servers $100_A$ and $100_B$ interact with a shared file system 115 that resides on a DSU 120 accessible through SAN 105. In an example embodiment, DSU 120 is a LUN of a data storage system 125 (e.g., disk array) connected to SAN 105. It will be appreciated that in this example embodiment, DSU 120 and shared file system 115 would be analogous to the formatted DSU 34A depicted in FIG. 2. That is to say, DSU 120 and shared file system 115 might make up a uniquely identifiable datastore. While DSU 120 is exposed to operating systems $110_A$ to $110_B$ by system storage manager 130 (e.g., disk controller) as a contiguous logical storage space, the actual physical data blocks upon which shared file system 115 is stored might dispersed across the various physical disk drives $135_X$ to $135_Z$ of data storage system 125.

Shared file system 115 contains a plurality of files of various types, typically organized into one or more directories. The shared file system 115 further includes metadata data structures that specify information about shared file system 115, such as block bitmaps that indicate which data blocks in shared file system 115 remain available for use, along with other metadata data structures indicating the directories and files in shared file system 115, along with their location. Sometimes referred to as a file descriptor or inode, each file and directory also has its own metadata data structure associated therewith, specifying various things, such as the data blocks that constitute the file or directory, the date of creation of the file or directory, etc.

Figure 4:
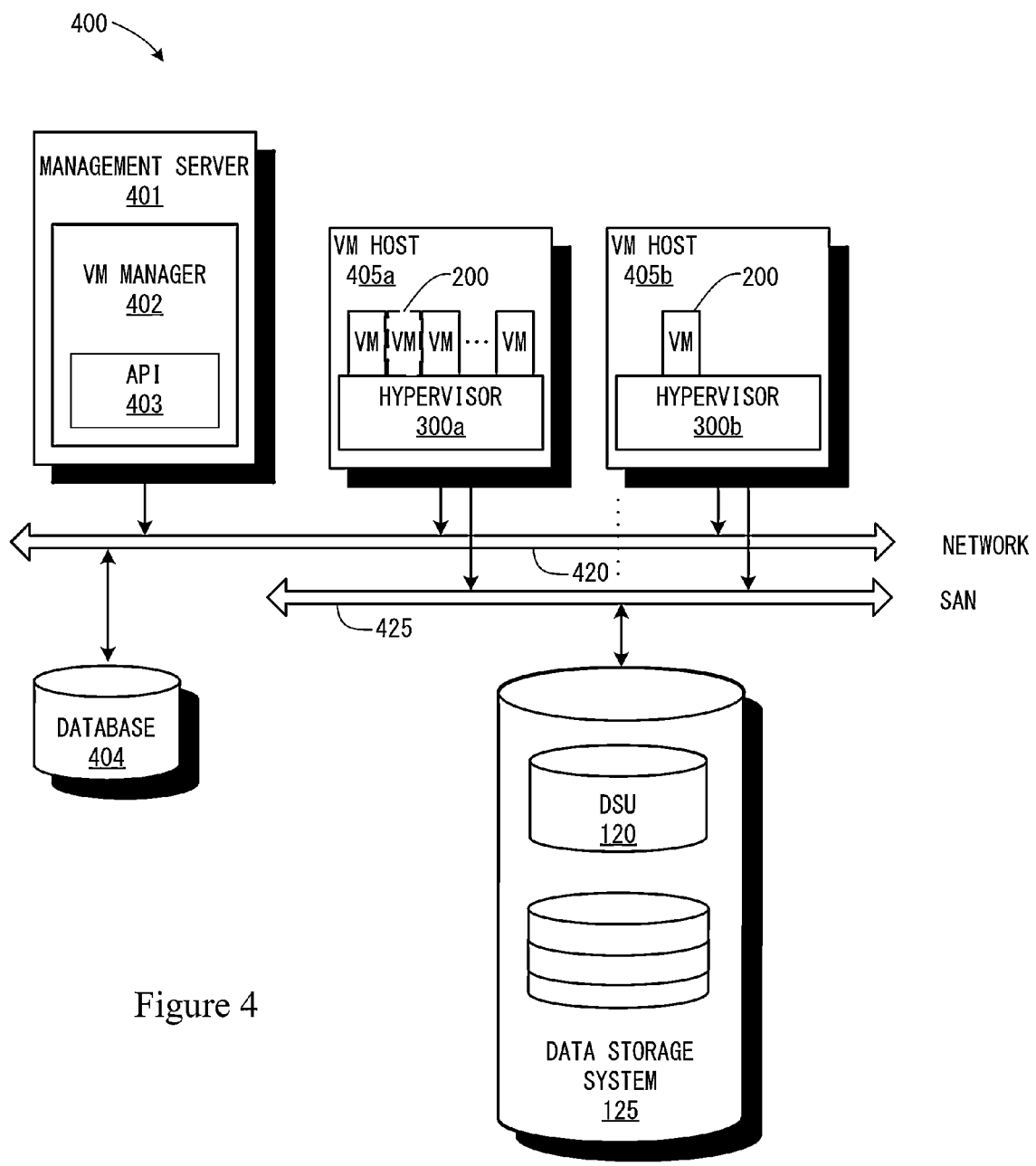
FIG. 4 is a schematic diagram illustrating an application program for the management of a group of hosts running virtualization software, in accordance with an example embodiment.

FIG. 4 is a schematic diagram illustrating an application program for the management of a group of hosts running virtualization software, in accordance with an example embodiment. As depicted in this figure, system 400 includes virtual machine (VM) manager 402, which is software that executes on a management server 401 running an OS (e.g., a Windows® OS or Linux®). In an example embodiment, VM manager 402 is capable of managing any number (e.g., 64 or more) VM hosts, such as VM hosts 405a and 405b, which are depicted as running on physical computer systems (e.g., an Intel or AMD x86 or x86-64 computer system). In an example embodiment, VM manager 402 might be VMware vCenter Server™ or a successor product sold by VMware, Inc. As shown in FIG. 4, VM manager 402 has access to a database 404, which might also run on the management server 401, or could run in a separate database server (not shown). Although shown as a physical computer system, it will be appreciated that management server 401 might be implemented as a virtual machine that runs in one of VM hosts 405a or 405b, in an alternative example embodiment.

Management server 401 is connected to the physical computer systems for VM hosts 405a and 405b via network 420, which might be a LAN (local area network), WAN (wide area network), Internet, or the like, or a combination of different networks. VM hosts 405a and 405b each execute a hypervisor 300a and 300b, respectively, each of which in turn supports one or more VMs 200. In an example embodiment, hypervisors 300a and 300b might be VMware ESX Server™ or a successor product sold by VMware, Inc. In general, commands flow from the VM manager 402 to hypervisors 300a and 300b, and information flows from hypervisors 300a and 300b to VM manager 402. API 403 provides an interface to access the functionality provided by VM manager 402. In one embodiment, API 403 is implemented as a web service receiving information or requests in XML format.

Also as depicted in FIG. 4, the physical computer systems for VM hosts 405a and 405b are connected via a storage area network (SAN) 425 to data storage system 125 which contains multiple DSUs, including DSU 120. As noted earlier, DSU 120 might be a LUN, in an example embodiment, which could be formatted with a shared file system such as VMFS to create a uniquely identifiable datastore. In this arrangement, hypervisors 300a and 300b share data storage system 125, that is to say, they both have access to DSU 120 for data storage operations including file operations, whether user-level (e.g., file reads and writes) or system-level (e.g., formatting DSU 120 with a shared file system).

Figure 5A:
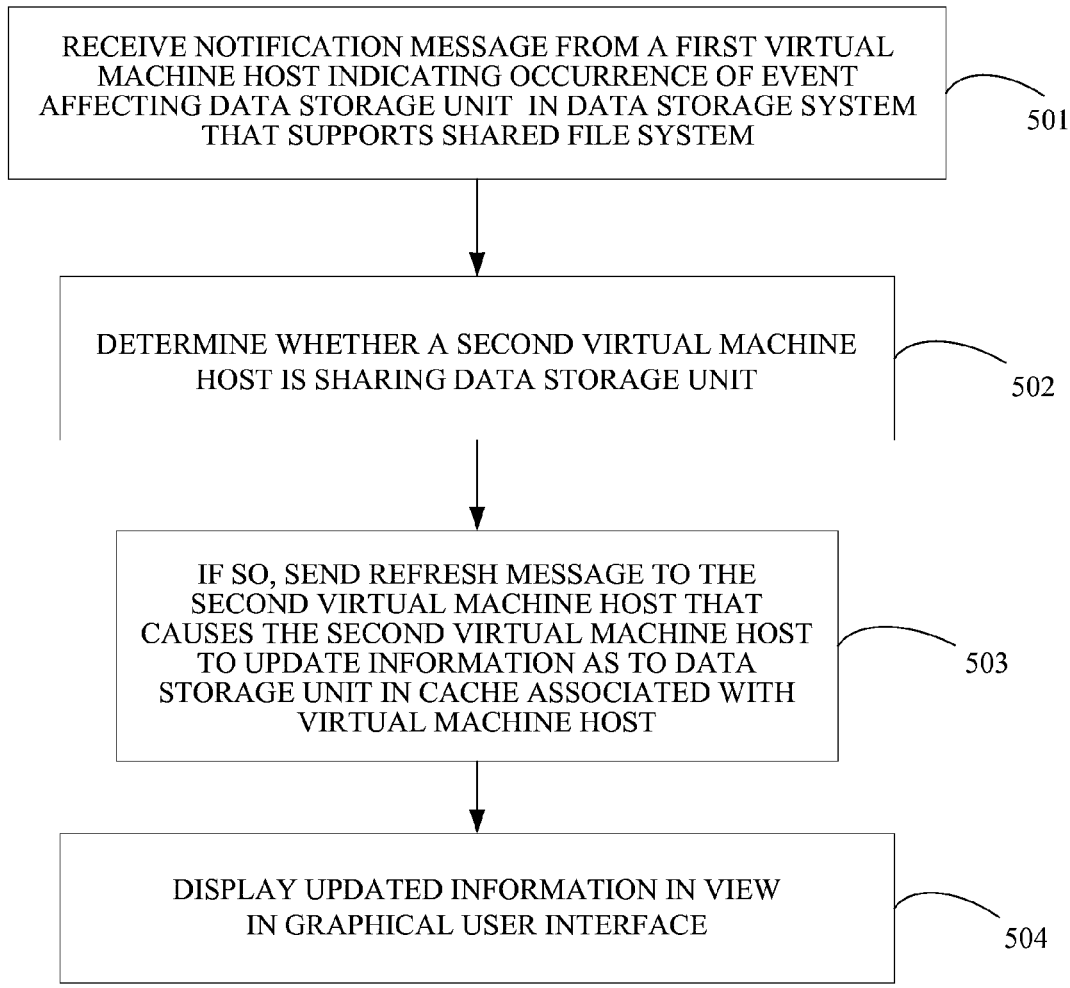
FIGS. 5A and 5B are flowchart diagrams showing processes for updating a VM host's information relating to a data storage unit in a shared data storage system, in accordance with an example embodiment.
Figure 5B:
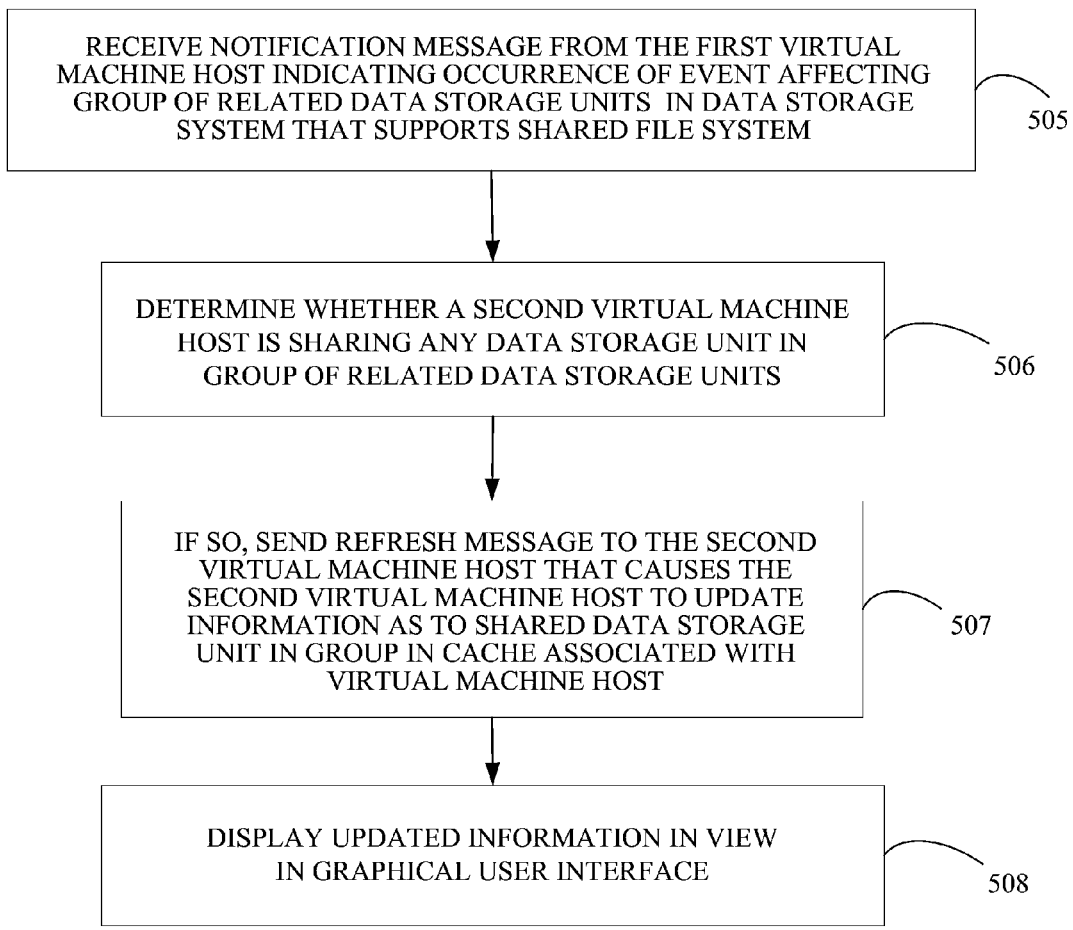

FIGS. 5A and 5B are flowchart diagrams showing processes for updating a VM host's information relating to a data storage unit in a shared data storage system, in accordance with an example embodiment. In an example embodiment, these processes might be executed by the VM manager depicted in FIG. 4.

In the first operation 501 of the process shown in FIG. 5A, a VM manager receives a notification message from a first VM host indicating an occurrence of an event affecting a DSU in a data storage system such as the data storage system described earlier, e.g., a data storage system that supports a shared (or clustered) file system as depicted in FIG. 3. In the process's next operation 502, the VM manager determines whether the first VM host as described above is sharing the DSU, e.g., with a second VM host and a Nth VM host as depicted in FIG. 4. If so, the VM manager sends a refresh message to the first, second and Nth VM hosts that share the affected DSU that causes all these VM hosts to update information as to the DSU in a cache associated with each of these VM hosts, in operation 503. Then in operation 504, the VM manager displays the updated information in a GUI view, as will be described in further detail below.

In an example embodiment, the notification message received by the VM manager in operation 501 might be from another VM host indicating that that VM host performed an operation on the DSU that resulted in the DSU receiving a file system, as depicted in FIGS. 1 and 2 described above. In a shared file system such as VMware's VMFS, such a DSU operation might take place during: (1) the creation of a file system by system-level software; (2) the upgrade of a file system by system-level software; (3) spanning a system-level file system over a previously unused DSU (e.g., to support another VM on the VM host); and (4) growing a system-level file system to include previously unused space on a DSU (e.g., to support another VM on the VM host). Alternatively, in an example embodiment, the notification message in operation 501 might be the result of (a) a hardware failure, e.g., the failure of a DSU, or (b) the intentional addition or removal of a DSU from a data storage system.

Also, in an example embodiment, the determination in operation 502 might be made by the VM manager by polling each of the VM hosts in the VM manager's database depicted in FIG. 4 to ascertain whether the VM host is sharing the affected DSU. In an alternative example embodiment, the VM manager might do this polling at specified intervals and store the results in the VM manager's database for later use as needed.

In an example embodiment, the refresh message sent by the VM manager might cause each receiving VM host to "rescan" each DSU in the data storage system (e.g., a SAN) and determine whether the DSU has been formatted with file system and become part of a datastore. If so, each receiving VM host would update its cache to reflect the new status. Alternatively, the notification message might cause the VM host to "rescan" a particular DSU, e.g., the DSU which was described in the notification message received by the VM manager and which might have resulted from the growing of a system-level file system by another VM host.

FIG. 5B involves a group of related DSUs (e.g., a group of DSUs in a spanned file system), rather than a single DSU. In the first operation 505 of the process shown in FIG. 5B, a VM manager receives a notification message indicating an occurrence of an event affecting the group of DSUs. For example, a spanned file system in VMFS might originally include 31 DSUs. If a VM host notifies the VM manager of the addition of another DSU to the file system, the addition will affect all 32 DSUs. That is to say, the 32 DSUs make up the group of related DSUs. In the process's next operation 506, the VM manager determines whether a VM host as described above is sharing any of the DSUs in the group, e.g., with other VM hosts. If so, the VM manager sends a refresh message to the VM host that causes the VM host to update information as to the shared DSU in a cache associated with the VM host, in operation 507. Then in operation 508, the VM manager displays the updated information in a GUI view, as will be described in further detail below.

It will be appreciated that the cache updating described above prevents data corruption, e.g., the data corruption that might occur if one VM host attempted to grow a system-level file system to include a DSU that erroneously appeared to be unused due to stale information in the VM host's cache, as described in greater detail below. Likewise, in an example embodiment, the cache updating described above might facilitate cluster operations (e.g., load balancing operations) on virtual machines, e.g., moving "live" virtual machines from one physical server to another using VMware's VMotion™ functionality.

Finally at this juncture, it will be appreciated that the processes described in FIGS. 5A and 5B might be executed by a manager program that manages instances of application programs other than a VM host, e.g., application programs such as databases or web servers. That is to say, the processes described in FIGS. 5A and 5B would help prevent data corruption and facilitate cluster operations if the instances of the application program access a shared or clustered file system such as the file system depicted in FIG. 3.

Figure 6A:
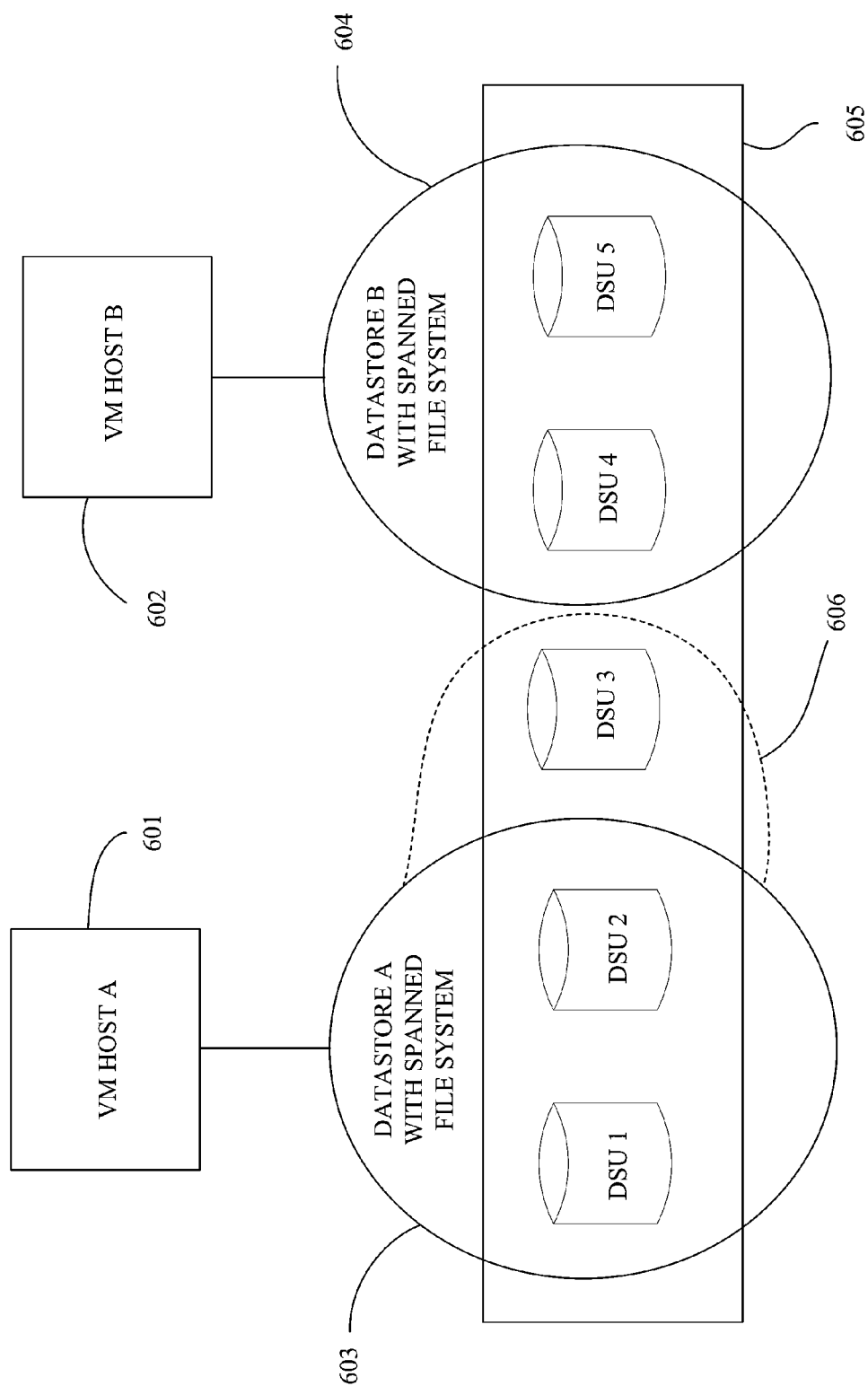
FIGS. 6A and 6B illustrate a problem addressed by the processes depicted in FIGS. 5A and 5B.
Figure 6B:
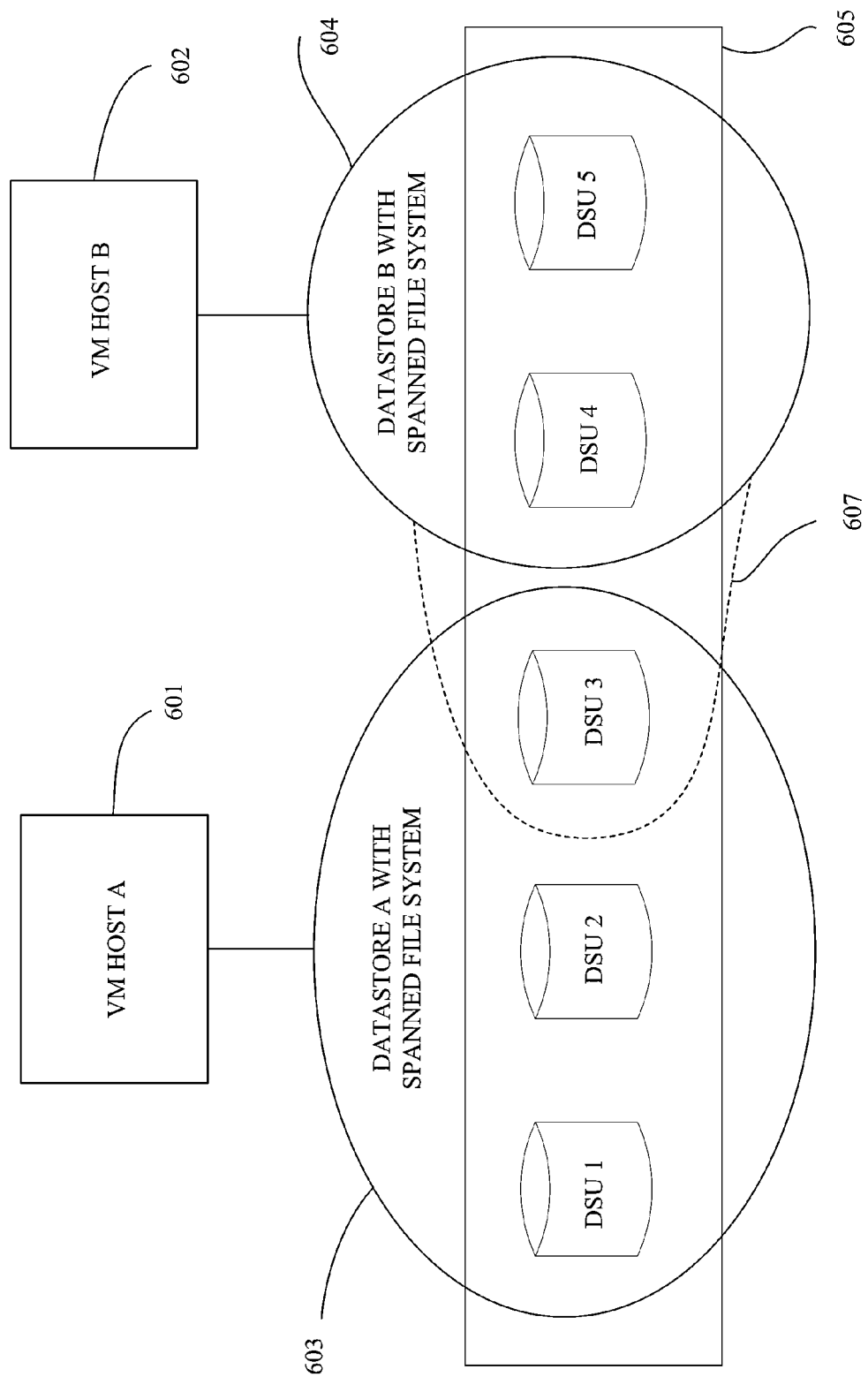

FIGS. 6A and 6B show scenarios that illustrate a problem addressed by the processes depicted in FIGS. 5A and 5B. In the scenario shown in FIG. 6A, VM host A (601) is associated with a datastore A (603) which initially includes a file system that spans only DSU 1 and DSU 2 from data storage system 605. In this scenario, VM host B (602) is associated with a datastore B which has a file system that spans DSU 4 and DSU 5 also from data storage system 605. It will be appreciated that the file system applied to datastore A is not necessarily the same file system applied to datastore B. That is to say, datastore A's file system might be VMFS, whereas datastore B's file system might be UFS. Alternatively, both file systems might be VMFS. Both VM host A and VM host B might be managed by a VM manager similar to the VM manager described above, which is not shown in this figure. In an operation 606, VM host A spans the file system applied to datastore A over unused DSU 3 in data storage system 605. Here it will be appreciated that this operation makes implicit use of the logical volume manager supporting the file system, as described earlier.

FIG. 6B depicts the results of this operation, in a scenario where the VM manager does not employ the processes described in FIGS. 5A and 5B. As shown in FIG. 6B, the file system applied to datastore A (603) now includes DSU 3, though this fact is not reflected in the cache maintained by VM host B (602). Consequently, VM host B performs operation 607 to span the file system applied to datastore B over DSU 3 in data storage system 605. It will be appreciated that this operation involves the re-formatting of DSU 3, which will result in loss or corruption of any files that datastore A has stored on DSU 3.

Figure 7A:
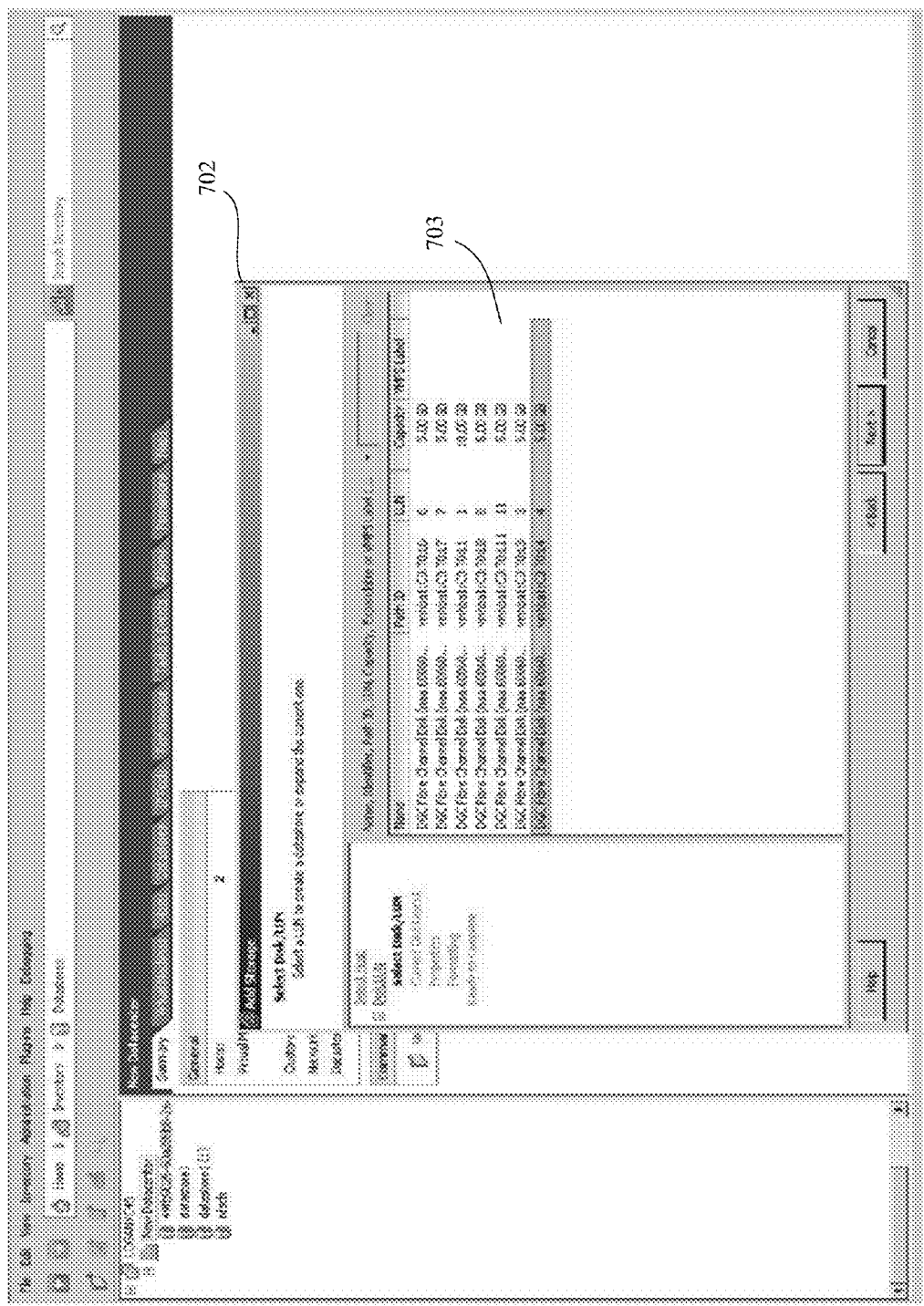
FIGS. 7A, 7B, 7C, 7D, and 7E illustrate GUI views which might be used with a shared file system.

FIGS. 7A, 7B, 7C, 7D, and 7E illustrate GUI views which might be used with a shared file system. These GUI views might be displayed by the VM manager described above. As depicted in FIG. 7A, view 701 allows a user to open dialog box 702 which allows the user to select a LUN to create a new datastore or expand the current datastore. In a typical scenario (or use case), the user has selected LUN 4 for the new datastore, as shown by the highlighting 703.

Figure 7B:
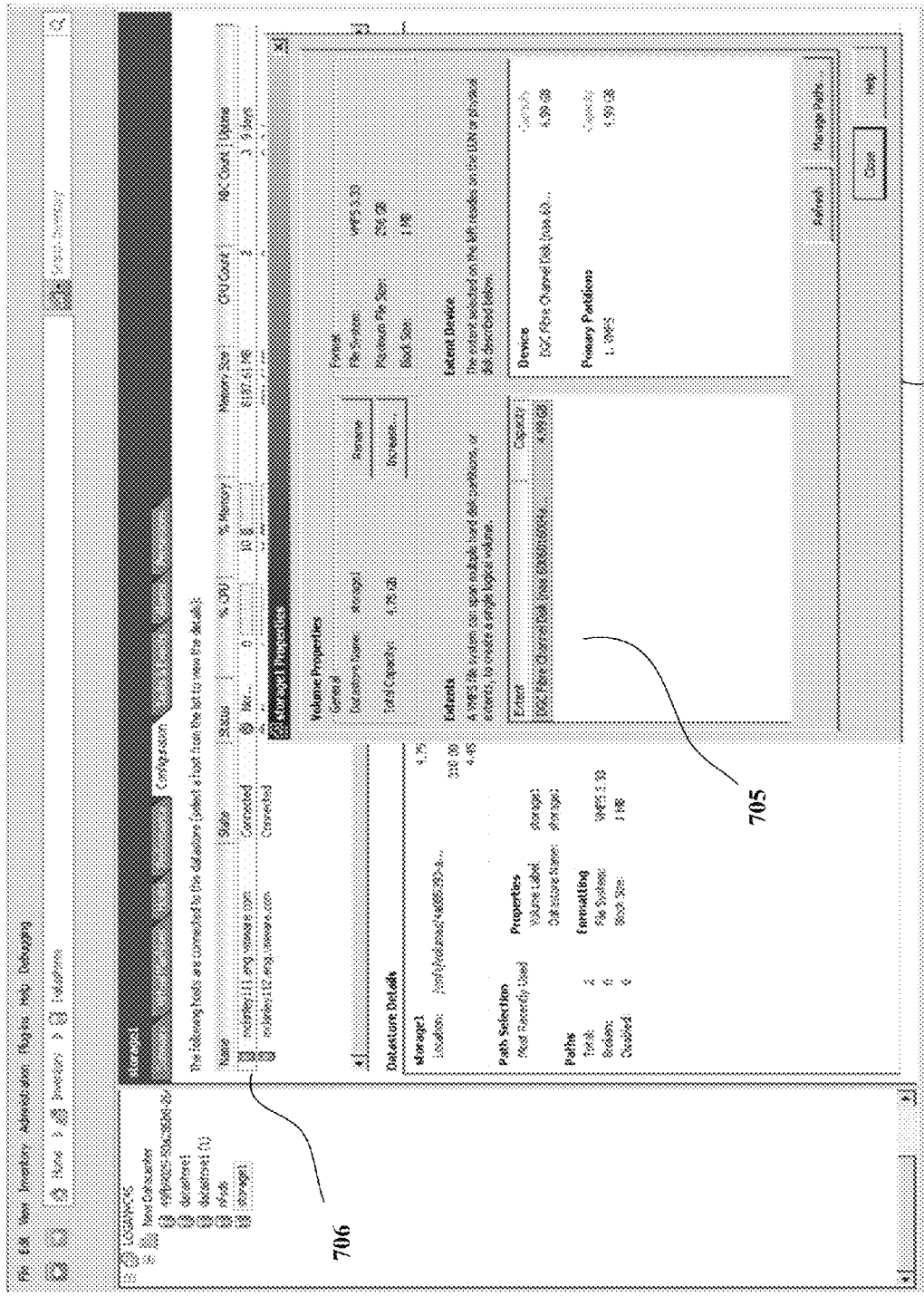

FIG. 7B shows a subsequent dialog box 704 that might be displayed by the VM manager to a user in this scenario. As noted by the highlighting 706, dialog box 704 is associated with a particular VM host, namely, the VM host identified as "mckinley111.eng.vmware.com". Dialog box 704 shows that LUN 4 (described in highlighting 705) has been formatted by the system software and added to a VMFS file system, e.g., LUN4 has become a datastore, e.g., the VMFS volume identified here as "storage1".

Figure 7C:
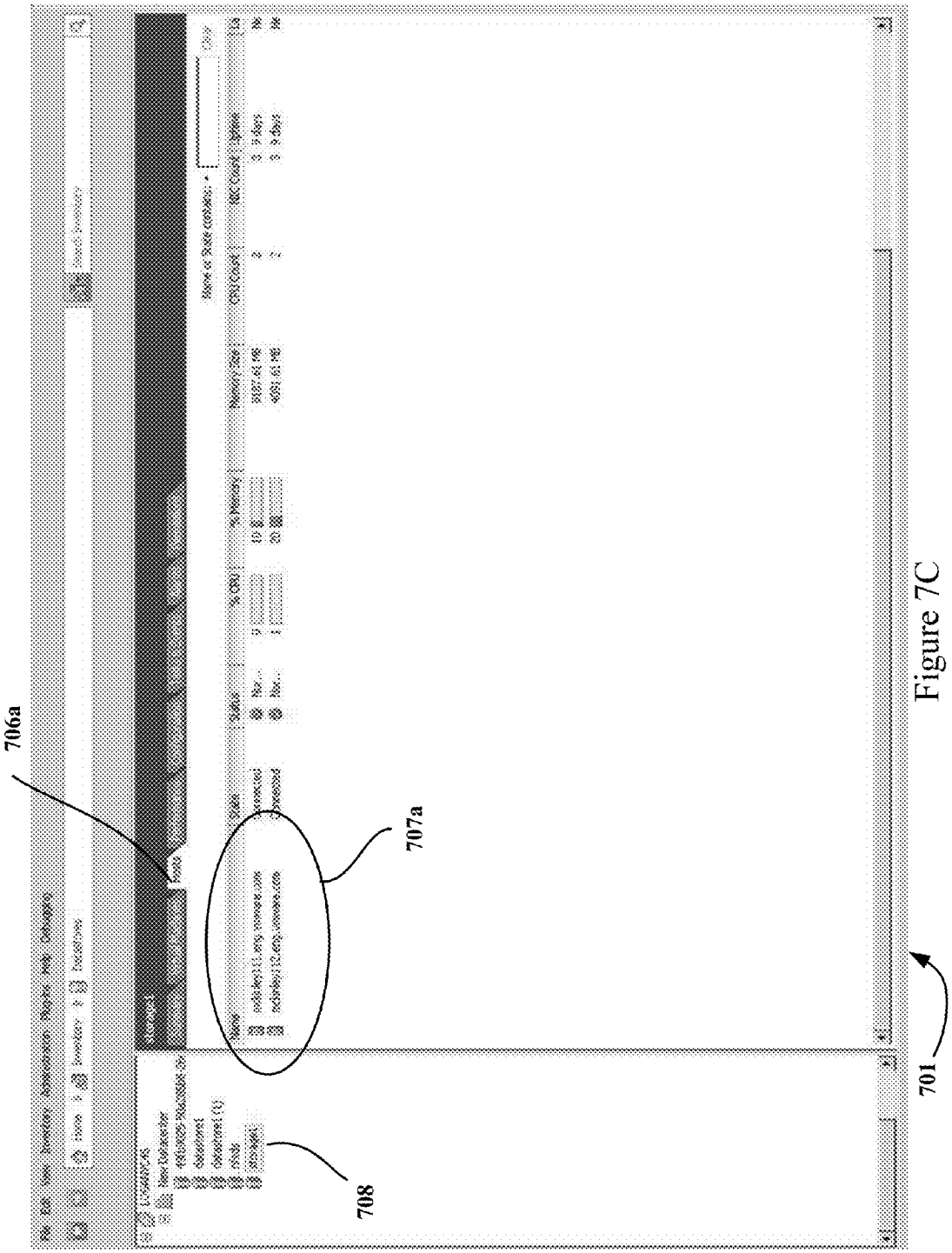

FIG. 7C shows a subsequent tabbed page 706a (labeled "Hosts") that might be displayed by a VM manager that uses the process described earlier. As noted by the highlighting 708, tabbed page 706a pertains to the datastore identified as "storage1". As indicated by the list 707a, both the VM host identified as "mckinley111.eng.vmware.com" and the VM host identified as "mckinley112.eng.vmware.com" recognize storage1 as a datastore.

Figure 7D:
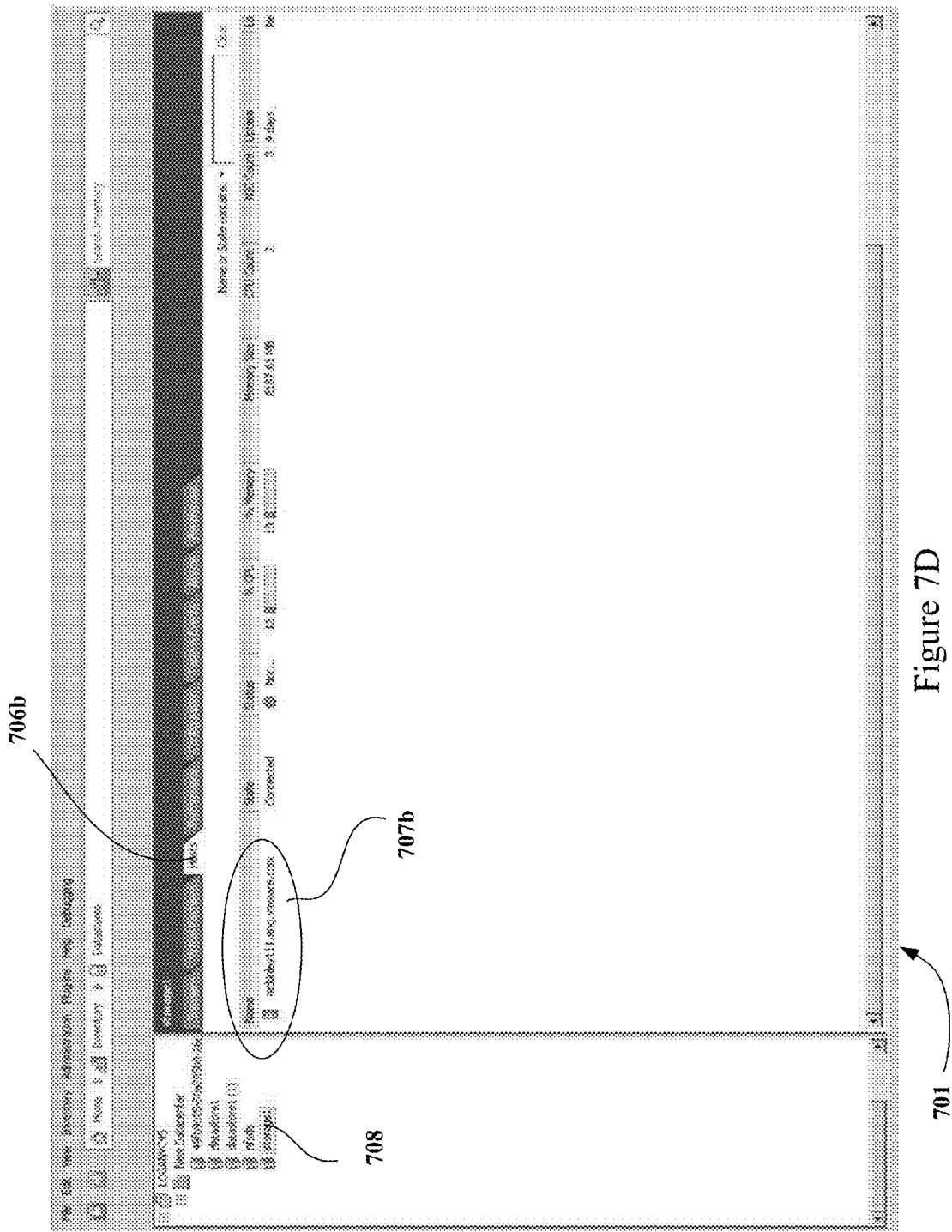

In contrast, FIG. 7D shows a tabbed page 706b (also labeled "Hosts") that might be displayed by a VM manager that does not use the process described earlier. As noted by the highlighting 708, tabbed page 706b pertains to the datastore identified as "storage1". But as indicated by the list 707b, only the VM host identified as "mckinley111.eng.vmware.com" recognizes "storage1" as a datastore. Recall that this is the VM host which created the datastore "storage1".

Figure 7E:
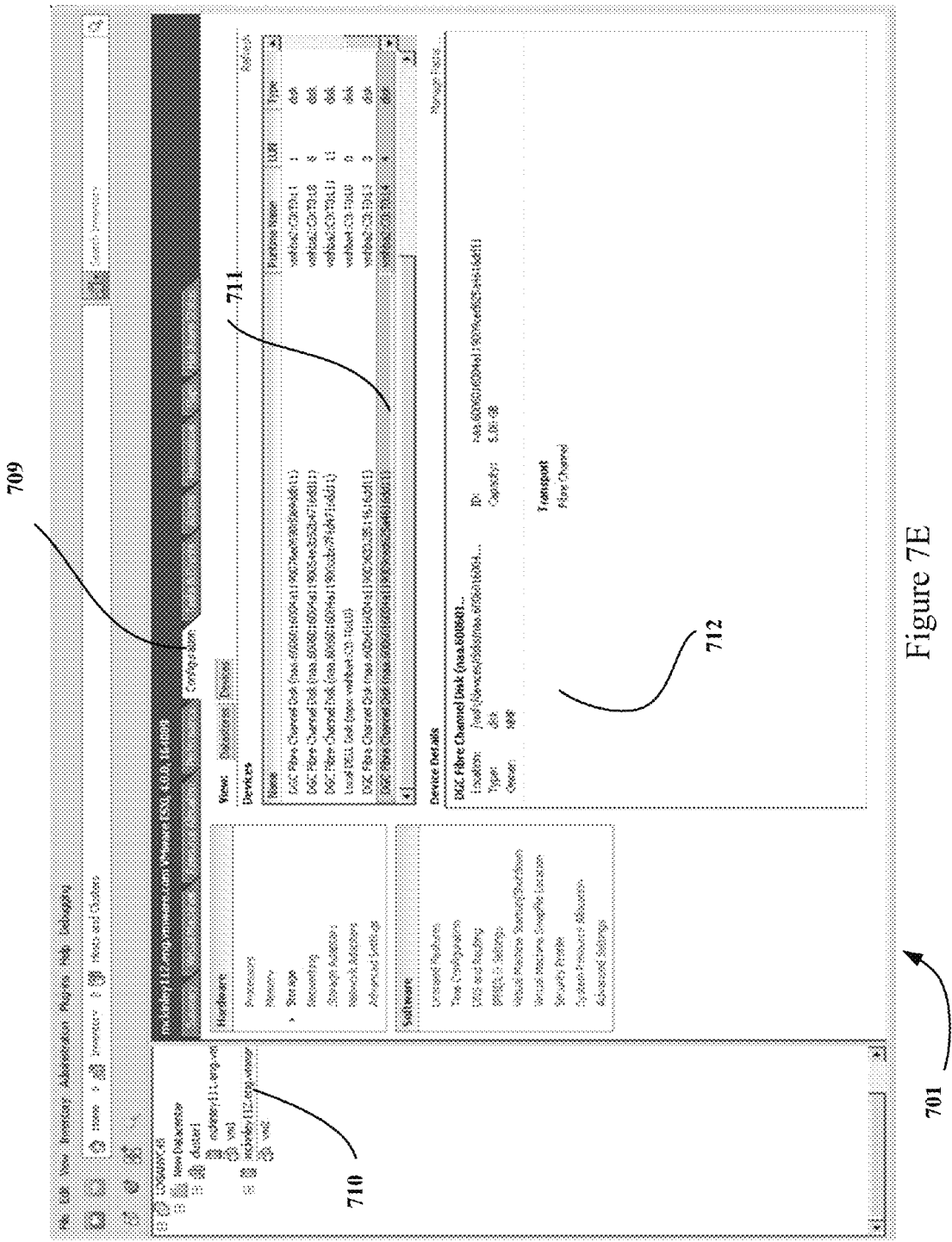

FIG. 7E shows a tabbed page 709 (labeled "Configuration") that might be displayed by a VM manager that does not use the process described earlier. As indicated by the highlighting 710, tabbed page 709 pertains to the VM host identified as "mckinley112.eng.vmware.com", which is the VM host that did not create the datastore identified as "storage1". As shown by the highlighting 711 and table 712, this VM host recognizes LUN 4, but does not recognize that LUN 4 has become a datastore. Consequently, this host might itself format LUN 4 as a datastore, leading to data corruption similar to that described earlier.

Any of the operations described herein that form part of the inventions are useful machine operations. The inventions also relate to a device or an apparatus for performing these operations. The apparatus may be specially constructed for that purpose or it may be a general-purpose computer selectively activated or configured by a computer program stored in the computer. In particular, various general-purpose machines may be used with computer programs written in accordance with the teachings herein or it may be more convenient to construct a more specialized apparatus to perform the operations.

The inventions can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be further appreciated that the instructions represented by the operations in the above figures are not required to be performed in the order illustrated and that all of the processing represented by the operations might not be necessary to practice the inventions. Further, the processes described in any of the above figures can also be implemented in software stored in any one of or combinations of the RAM, the ROM, or the hard disk drive.

Although the foregoing inventions have been described in some detail for purposes of clarity of understanding, it will be apparent that certain changes and modifications can be practiced within the scope of the appended claims. In this regard, it will be appreciated that there are many other possible orderings of the operations in the processes described above and many possible modularizations of those orderings, e.g., within virtualization software and/or within host OSs and/or guest OSs. Accordingly, the present embodiments are to be considered as illustrative and not restrictive, and the invention is not to be limited to the details given herein, but may be modified within the scope and equivalents of the appended claims. In the appended claims, elements and/or operations do not imply any particular order of operation, unless explicitly stated in the claims or implicitly required by the disclosure.

What is claimed is:

1. A method, comprising:
   receiving, by a computing device, a notification message from a first host indicating an occurrence of an event corresponding to a logical unit of a data storage system, the first host causing the occurrence of the event;
   determining, by the computing device, whether a second host having access to the data storage system also shares access to the logical unit with the first host, the second host being different from the first host; and
   sending, by the computing device, a refresh message to the second host that causes the second host, upon receiving the refresh message, to scan at least a portion of the data storage system including the logical unit to determine a data storage status associated with a format of the logical unit, wherein the scan causes an update that changes information describing the status of the format of the logical unit to reflect the occurrence of the event, the information being stored in storage associated with the second host.

2. The method as in claim 1, wherein a plurality of hosts including the second host share access to the logical unit with the first host, the method further comprising:
   sending, by the computing device, the refresh message to the plurality of hosts that causes each host in the plurality of hosts to independently scan at least the portion of the data storage system including the logical unit to determine the data storage status associated with a format of the logical unit, wherein the scan causes a respective update that changes information describing the data storage status of the format of the logical unit to reflect the occurrence of the event, the information being stored in respective storage associated with each host.

3. The method as in claim 1, wherein the second host scans each logical unit in the data storage system in response to receiving the refresh message.

4. The method as in claim 1, wherein the refresh message identifies the logical unit and the second host only scans the logical unit.

5. The method as in claim 1, further comprising:
   determining, by the computing device, a status report of the data storage system by reviewing the storage associated with the second host and storage associated with the first host, wherein the storage associated with the first host includes the information reflecting the occurrence of the event; and
   outputting the status report of the data storage system on an interface, the status report indicating the first host and the second host have information stored in respective storage reflecting the occurrence of the event.

6. The method as in claim 1, wherein:
   the event relates to the first host performing an operation on the logical unit that resulted in the logical unit being formatted as part of a logical data storage entity, and
   the scan causes the second host to change the information to reflect the operation on the logical unit that resulted in the logical unit being formatted as part of the logical data storage entity.

7. The method as in claim 1, wherein:
   the event relates to the first host performing an operation on the logical unit that resulted in the logical unit being formatted with a file system, and
   the scan causes the second host to change the information to reflect the operation on the logical unit that resulted in the logical unit being formatted with the file system.

8. A non-transitory computer-readable storage medium containing instructions for controlling a computer system to be configured for:
   receiving a notification message from a first host indicating an occurrence of an event corresponding to a logical unit of a data storage system, the first host causing the occurrence of the event;
   determining whether a second host having access to the data storage system also shares access to the logical unit with the first host, the second host being different from the first host; and
   sending a refresh message to the second host that causes the second host, upon receiving the refresh message, to scan at least a portion of the data storage system including the logical unit to determine a data storage status associated with a format of the logical unit, wherein the scan causes an update that changes information describing the status of the format of the logical unit to reflect the occurrence of the event, the information being stored in storage associated with the second host.

9. The non-transitory computer-readable storage medium as in claim 8, wherein a plurality of hosts including the second host share access to the logical unit with the first host, the computer system further configured for:
   sending the refresh message to the plurality of hosts that causes each host in the plurality of hosts to independently scan at least the portion of the data storage system including the logical unit to determine the data storage status associated with a format of the logical unit, wherein the scan causes a respective update that changes information describing the data storage status of the format of the logical unit to reflect the occurrence of the event, the information being stored in respective storage associated with each host.

10. The non-transitory computer-readable storage medium as in claim 8, wherein the second host scans each logical unit in the data storage system in response to receiving the refresh message.

11. The non-transitory computer-readable storage medium as in claim 8, wherein the refresh message identifies the logical unit and the second host only scans the logical unit.

12. The non-transitory computer-readable storage medium as in claim 8, further configured for:
   determining a status report of the data storage system by reviewing the storage associated with the second host and storage associated with the first host, wherein the storage associated with the first host includes the information reflecting the occurrence of the event; and
   outputting the status report of the data storage system on an interface, the status report indicating the first host and the second host have information stored in respective storage reflecting the occurrence of the event.

13. The non-transitory computer-readable storage medium as in claim 8, wherein:
the event relates to the first host performing an operation on the logical unit that resulted in the logical unit being formatted as part of a logical data storage entity, and
the scan causes the second host to change the information to reflect the operation on the logical unit that resulted in the logical unit being formatted as part of the logical data storage entity.

14. The non-transitory computer-readable storage medium as in claim 8, wherein:
the event relates to the first host performing an operation on the logical unit that resulted in the logical unit being formatted with a file system, and
the scan causes the second host to change the information to reflect the operation on the logical unit that resulted in the logical unit being formatted with the file system.

15. An apparatus comprising:
one or more computer processors; and
a non-transitory computer-readable storage medium comprising instructions, that when executed, control the one or more computer processors to be configured for:
receiving a notification message from a first host indicating an occurrence of an event corresponding to a logical unit of a data storage system, the first host causing the occurrence of the event;
determining whether a second host having access to the data storage system also shares access to the logical unit with the first host, the second host being different from the first host; and
sending a refresh message to the second host that causes the second host, upon receiving the refresh message, to scan at least a portion of the data storage system including the logical unit to determine a data storage status associated with a format of the logical unit, wherein the scan causes an update that changes information describing the status of the format of the logical unit to reflect the occurrence of the event, the information being stored in storage associated with the second host.

16. The apparatus as in claim 15, wherein a plurality of hosts including the second host share access to the logical unit with the first host, the one or more computer processors further configured for:
sending the refresh message to the plurality of hosts that causes each host in the plurality of hosts to independently scan at least the portion of the data storage system including the logical unit to determine the data storage status associated with a format of the logical unit, wherein the scan causes a respective update that changes information describing the data storage status of the format of the logical unit to reflect the occurrence of the event, the information being stored in respective storage associated with each host.

17. The apparatus as in claim 15, wherein the second host scans each logical unit in the data storage system in response to receiving the refresh message.

18. The apparatus as in claim 15, wherein the refresh message identifies the logical unit and the second host only scans the logical unit.

19. The apparatus as in claim 15, further configured for:
determining a status report of the data storage system by reviewing the storage associated with the second host and storage associated with the first host, wherein the storage associated with the first host includes the information reflecting the occurrence of the event; and
outputting the status report of the data storage system on an interface, the status report indicating the first host and the second host have information stored in respective storage reflecting the occurrence of the event.

20. The apparatus as in claim 15, wherein:
the event relates to the first host performing an operation on the logical unit that resulted in the logical unit being formatted as part of a logical data storage entity, and
the scan causes the second host to change the information to reflect the operation on the logical unit that resulted in the logical unit being formatted as part of the logical data storage entity.

21. The apparatus as in claim 15, wherein:
the event relates to the first host performing an operation on the logical unit that resulted in the logical unit being formatted with a file system, and
the scan causes the second host to change the information to reflect the operation on the logical unit that resulted in the logical unit being formatted with the file system.

* * * * *